(12) United States Patent
Tryphonos

(10) Patent No.: US 7,429,226 B2
(45) Date of Patent: Sep. 30, 2008

(54) TENSIONING DEVICE

(75) Inventor: Andreos Tryphonos, Ilmmuenster (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 23 days.

(21) Appl. No.: 11/602,301

(22) Filed: Nov. 21, 2006

(65) Prior Publication Data

US 2007/0066428 A1    Mar. 22, 2007

Related U.S. Application Data

(63) Continuation of application No. PCT/EP2005/001288, filed on Feb. 9, 2005.

(51) Int. Cl.
*F16H 7/08* (2006.01)
(52) U.S. Cl. .................. 474/111; 424/109; 424/110
(58) Field of Classification Search .......... 474/109, 474/110, 111, 117, 140
See application file for complete search history.

(56) References Cited

U.S. PATENT DOCUMENTS

| | | | | |
|---|---|---|---|---|
| 3,069,920 A * | 12/1962 | Cole et al. | .................. | 474/111 |
| 3,463,025 A * | 8/1969 | Poyser et al. | ................. | 474/111 |
| 3,888,217 A * | 6/1975 | Hisserich | .................. | 123/90.31 |
| 3,964,331 A * | 6/1976 | Oldfield | .................. | 474/110 |
| 5,055,088 A | 10/1991 | Cradduck et al. | | |
| 5,159,904 A * | 11/1992 | Ingold | .................. | 123/90.15 |
| 5,776,024 A * | 7/1998 | White et al. | ................. | 474/110 |
| 6,358,169 B1 * | 3/2002 | Markley | .................. | 474/111 |
| 6,609,987 B1 * | 8/2003 | Beardmore | .................. | 474/111 |
| 6,623,391 B2 * | 9/2003 | Young et al. | ................. | 474/111 |
| 2003/0228948 A1 * | 12/2003 | Garbagnati et al. | ......... | 474/110 |
| 2006/0270502 A1 * | 11/2006 | Markley et al. | ............. | 474/111 |
| 2007/0093328 A1 * | 4/2007 | Markley | ..................... | 474/111 |

FOREIGN PATENT DOCUMENTS

| | | |
|---|---|---|
| DE | 8 32 527 | 2/1952 |
| DE | 39 33 943 A1 | 5/1990 |
| DE | 41 14 948 A1 | 12/1991 |
| DE | 201 02 748 U1 | 1/2002 |
| DE | 100 44 645 A1 | 3/2002 |
| EP | 0 823 543 B1 | 2/1998 |
| EP | 1 262 685 A2 | 4/2002 |
| EP | 1 369 621 A2 | 12/2003 |
| JP | 11-63128 | 5/1999 |

OTHER PUBLICATIONS

International Search Report dated May 11, 2005 with English translation of relevant portion (Seven (7) Pages).
German Search Report dated Feb. 23, 2005 with an English translation thereof (Eight (8) Pages).

* cited by examiner

*Primary Examiner*—Richard W L Ridley
*Assistant Examiner*—Terence Boes
(74) *Attorney, Agent, or Firm*—Crowell & Moring LLP

(57) ABSTRACT

A traction mechanism, in particular for driving the camshafts of an internal combustion engine, is provided. The mechanism includes a drive wheel, a driven wheel, a traction element and first and second tensioner slide rails. One slide rail can be subjected to a clamping force by a first clamping device that is supported both on the slide rail and externally. The first slide rail is connected to the second slide rail in a manner that transmits a defined force or displacement.

18 Claims, 7 Drawing Sheets

TENSIONING DEVICE

CROSS-REFERENCE TO RELATED APPLICATIONS

This application is a continuation of PCT International Application No. PCT/EP2005/001288, filed on Feb. 9, 2005, which claims priority under 35 U.S.C. §119 to German Application No. 10 2004 028 017.7, filed Jun. 8, 2004, the entire disclosures of which are expressly incorporated by reference herein.

BACKGROUND AND SUMMARY OF THE INVENTION

The invention relates to a traction mechanism, particularly for driving camshafts of an internal-combustion engine, including a driving wheel, an output wheel, a traction device, as well as a first and a second tensioner rail.

The driving of camshafts of internal-combustion engines normally takes place starting from the crankshaft by way of a traction device, such as a timing chain or timing belt. Tensioners for tensioning the traction device are used for preventing transverse vibrations, in particular. Such an arrangement having a chain tensioner including a saddle, which is mechanically acted upon by the force of a leaf spring, is described in German Patent document DE 4114948 A1.

When the tension is increased in the side of the belt assigned to the tensioner, for example, as a result of oscillations of the camshafts, a play occurs at least for a short time in the other end, in an arrangement described, for example, in German Patent document DE 4114948 A1, so that undesirable transverse vibrations are incited in the traction device. A driving system as illustrated in German Patent document DE 201 02 748 U1 could provide a remedy, according to which two tensioner rails are swivellably linked on one side to a housing of a tensioning device, and hydraulic pistons with an opposite tensioning direction which act from the inside against the tensioner rails are arranged in the housing between the tensioner rails. The pistons are supplied by way of a common hydraulic connection, so that the tensioning action is coordinated. The driving system from German Patent document DE 201 02 748 U1 comprises two tensioning devices which, including the housing, the tensioning pistons and the tensioner rails, are constructed symmetrically with respect to a center line.

According to German Patent document DE 201 02 748 U1, the two swivellable tensioner rails are mutually connected by way of the two coupled hydraulic pistons in a force- and motion-transmitting manner. However, there is neither a reference to the fixed internal-combustion engine housing, nor can the transmission of vibrations of one tensioner rail, for example, incited by oscillating camshafts, to the other tensioner rail, be controlled. Furthermore, the symmetrical development of the tensioning device, which causes a linear vibration system, promotes the buildup of vibrations and thus the risk of damage to, or even the destruction of, the traction mechanism. Air trapped in the hydraulic system of the pistons may present another problem, which has the result that an unknown spring system exists between the tensioner rails.

It is therefore an object of the invention to provide a traction mechanism which permits a defined and controlled action of tension force upon the tensioner rails for the effective prevention of undesirable transverse vibrations. In addition, the traction mechanism is to have a simple and advantageous construction and should be producible, mountable and maintainable.

This object is achieved according to the invention, in which a tensioner rail can be acted upon by tension force by way of a first tensioning device supported on one side on the tensioner rail and, on the other side externally on a fixed reference point, such as the internal-combustion engine housing. The first tensioner rail is connected with the second tensioner rail in a defined force- and motion-transmitting manner. In this fashion, the vibration of a tensioner rail can be controlled with respect to a fixed external reference point and no undefined or undamped vibration transmission can take place from one tensioner rail to the other. The essential parameters of the traction mechanism are defined and can be coordinated in a favorable manner.

On the whole, the vibrations of the camshaft drive and the loading of the traction device are considerably reduced by the solution according to the invention. The traction device may be constructed to be significantly lighter and the operational reliability can clearly be increased. The operation of the charge cycle valves of the internal-combustion engine by way of the cams can be better controlled resulting in a more precise timing, so that the internal-combustion engine may be operated more efficiently. The improved camshaft-side traction mechanism also has positive effects on the drive of the auxiliaries, such as the water pump, the air-conditioning compressor, the starter and/or the generator, in that these auxiliaries may now also have a lighter construction or their operational reliability and service live is increased. Finally, as a result of a reduction of the crankcase vibrations, noise generating is reduced; the timing gear runs more smoothly. The reduction of vibrations finally benefits the entire transmission line.

Particularly preferred embodiments and further developments of the invention are described and claimed herein.

It was found to be advantageous for the tensioner rails to be connected by way of a spring-and-damper device. The transmission of vibrations from one tensioner rail to the other tensioner rail therefore takes place as a function of the parameterization of the spring-and-damper device in a sprung and/or damped manner, a coordination of the spring fraction and of the damper fraction being permitted within largely arbitrary limits corresponding to the system requirements. According to a very expedient embodiment, the spring-and-damper device has a fixed characteristic curve, in which case a particularly advantageous characteristic curve can be determined by tests and/or calculation. Cost-effective standard components can be used.

According to another embodiment, the spring-and-damper device is adjustable. The characteristic curve of the spring-and-damper device can then, for example, be individually coordinated with the system within the framework of the assembly and, as required, can be readjusted after some time during the operation and can be adapted to changed marginal conditions.

According to another embodiment of the traction mechanism according to the invention, the tensioner rails are connected by way of a two-part joint device, a first part of the joint device being assigned to the first tensioner rail and a second part of the joint device being assigned to the second tensioner rail. The two parts of the joint arrangement, which are rigid per se, can be moved with respect to one another and thus the two tensioner rails can also be moved with respect to one another in a defined manner. An intervention into the joint arrangement permits a control of the movement.

It is particularly preferable for the second part of the joint device, starting from a pivot assigned to the second tensioner rail, to have two lever arms, in which case a first lever arm is connected with the first part of the joint device, and a second lever arm can be acted upon by tension force by a second tensioning device. The force applied by the second tensioning device acts by way of the second lever arm; a rotatory action upon the second part of the joint device takes place. By way of the first lever arm, the first part of the joint device is pulled toward the second part of the joint device, so that the traction device is tensioned.

It is a significant advantage for the second tensioning device to be supported on the second lever arm on the one hand, and, on the internal-combustion engine side, on the other hand. In this manner, the vibration of the second tensioner rail with respect to the internal-combustion engine housing, which represents a fixed external reference point, can be controlled, and the two tensioner rails cannot vibrate in an undefined or undamped manner.

It is very expedient for the axes of the lever arms to be arranged at an angle with respect to one another starting from the pivot. The size of the angle depends on the construction and may be in the range of, for example, 100° to 130°.

It was found to be advantageous for the first part of the joint device to have an essentially straight further development, one end being connected with the second part of the joint device and the other end being connected with the first tensioner rail in a force- and motion-transmitting manner. A straight further development of the first part of the joint device is advantageous under the aspect of a predominant tensile stress but a different further development may be preferred, possibly because of marginal constructive conditions.

It is also particularly preferable for the first part of the joint device to have two lever arms starting from a pivot assigned to the first tensioner rail, in which case one lever arm is connected with the second part of the joint device and the other lever arm can be acted upon by tension force by way of the first tensioning device. In this case, an additional tensioning device will not be necessary, so that the traction mechanism as a whole consists of fewer parts. By way of the first tensioning device, which is externally supported on a fixed reference point, the first tensioner rail can be acted upon in a defined and controlled manner and, simultaneously, the first and the second tensioner rail can be acted upon in the tensioning direction in a defined and controlled manner by way of the two-part joint device.

Even if only one tensioning device is used, it is just as expedient as when using two tensioning devices for the axes of the lever arms to be arranged at an angle with respect to one another starting from the pivot; for the size of the angle to be dependent on the construction, for example, within the range of from 120° to 140°; and for he first part of the joint device to have an essentially straight further development. In that case, one end is connected with the second part of the joint device and the other end is connected with the first tensioner rail in a force- and motion-transmitting manner.

In another, also preferable embodiment of the traction mechanism according to the invention, the two parts of the joint device are mutually connected in a hinge point, and the hinge point can be acted upon by tension force by a second tensioning device. This embodiment does not require a part of the joint device which is acted upon rotatorily, and therefore has a kinematically simpler construction. The coordination of the tensioning action is, therefore, also correspondingly simpler.

The second tensioning device is expediently supported on the hinge point, on the one hand, and on the internal-combustion engine side, on the other hand, so that a defined and controlled tensioning of the traction device becomes possible with respect to the fixed housing of the internal-combustion engine.

According to another, also preferable embodiment of the invention, a second tensioning device acts between the tensioner rails, which, on one side, is supported on the first tensioner rail and, on the other side, is supported on the second tensioner rail. Even if, in this case, a reference to a fixed external reference point takes place only by way of the first tensioning device which is assigned to the first tensioner rail, a defined and controlled tensioning of the traction device can also be achieved by way of the second tensioner rail by way of the second tensioning device.

It is very advantageous for the second tensioning device to, on the one side, be connected directly with a tensioner rail, to be arranged outside the tensioner rails and to, on the other side, be connected with the other tensioner rail by use of a connection element. For constructive reasons, it is advantageous to further develop the connection element in the shape of a crescent.

A hydraulic, mechanical, electromagnetic, electromotive or pneumatic operation of the first and/or second tensioning device is particularly preferred. The tensioning device expediently includes a piston which can be acted upon hydraulically, in which case the tensioning device can be hydraulically supplied with lubricating oil of the internal-combustion.

It may be considered to be very advantageous if the tensioning device can be acted upon by an at least approximately constant pressure, which does not fall below a predetermined minimum value, so that the traction device can be constantly tensioned by a predetermined minimum force. According to another, also advantageous embodiment, the tensioning device can be acted upon in a controlled manner by a discretely or continuously varying pressure, so that the tension of the traction device can be adapted to changing marginal conditions.

According to a particularly preferred embodiment of the invention, the first tensioning device and/or the second tensioning device may be supplied with pressure medium by way of a check valve. In this manner, an at least one-sided uncoupling from the pressure medium supply is achieved, so that, for example, both tensioning devices can be supplied with oil from the oil circulating system of the internal-combustion engine, but vibrations of one tensioner rail nevertheless have no negative influence on the other tensioner rail. The pressure medium acts upon the first and/or the second tensioner rail in the tensioning direction; the check valve ensures that the tensioning pressure is maintained.

It is very expedient for the first and the second tensioner rail to have differently shaped guiding areas, so that the traction mechanism does not have a linear construction and the incitation or continuation of vibrations is avoided from the start.

Other objects, advantages and novel features of the present invention will become apparent from the following detailed description of the invention when considered in conjunction with the accompanying drawings.

DETAILED DESCRIPTION OF THE DRAWINGS

Figure 1:
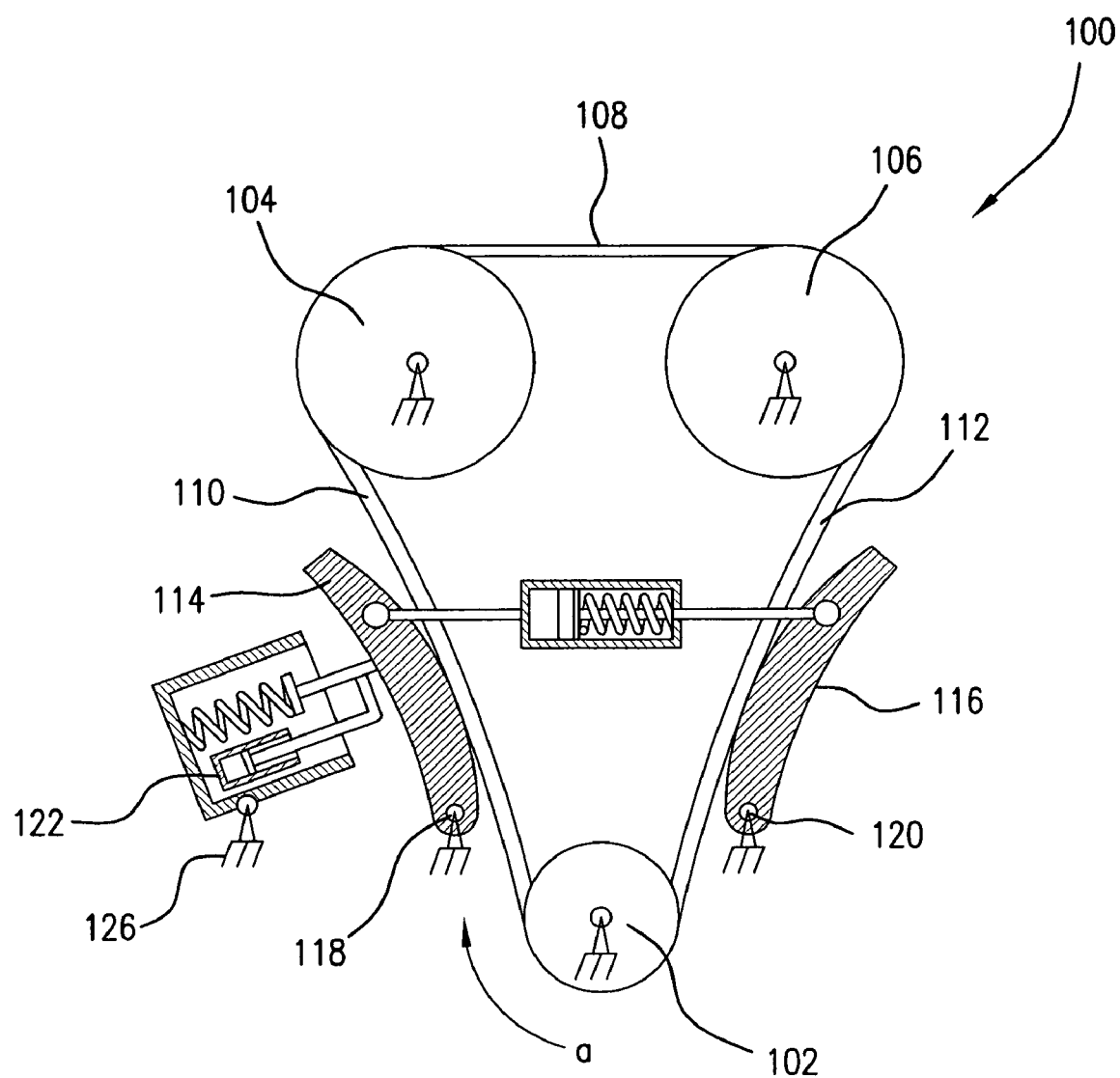
FIG. 1 is a schematic view of an example of a traction mechanism having two tensioner rails and one tensioning device arranged between a tensioner rail and a fixed reference point, the tensioner rails being connected by way of a spring-and-damper device.

FIG. 1 shows a traction mechanism 100 having two tensioner rails 114, 116 connected by way of a spring-and-damper device 124, and a tensioning device 122 arranged between the tensioner rail 114 and a fixed reference point 126.

Corresponding to the traction mechanism 100 illustrated in FIG. 1, camshafts 104, 106 are driven starting from the crankshaft 102 of a four-stroke piston internal-combustion engine (not shown here in detail). In this case, one of the camshafts is used for controlling the intake valves, the other for controlling the exhaust valves. Here, a timing chain 108 is provided for the force/motion transmission, in which case a belt or another traction mechanism may be provided instead of a chain.

As illustrated in FIG. 1 by corresponding diameters of the driving wheels assigned to the crankshaft 102 or the camshafts 104, 106, the camshafts 104, 106 rotate at half the rotational speed with respect to the crankshaft 102, so that one charge cycle and one compression cycle occurs during two crankshaft rotations.

In a rotational direction of the crankshaft 102 corresponding to the direction of the arrow a, chain section 110 forms the slack side and chain section 112 forms the loaded side, in which case the rotation, as required, may also take place in the opposite direction, so that chain section 110 forms the loaded side and chain section 112 forms the slack side.

One tensioner rail 114, 116 is assigned to each of the chain sections 110, 112, which tensioner rail 114, 116 is constructed, for example, in a rail shape and reaches around the chain 108 also in a laterally guiding manner. The tensioner rails 114, 116 preferably consist of an oil-, heat- and abrasion-resistant plastic material with good sliding characteristics and are in each case swivellably connected at their one end 118, 120 facing the crankshaft with the housing 126 of the internal-combustion engine, pins inserted at the internal-combustion engine housing being provided for the rotatable connection. The respective other ends of the tensioner rails 114, 116 are mutually connected by way of a spring-and-damper device 124. Therefore, the free ends of the tensioner rails 114, 116 can basically be swiveled jointly in the same direction and/or in a damped sprung manner against one another.

A tensioning device 122, which is supported on the internal-combustion engine housing 126 as the fixed external reference point, is assigned to the tensioner rail 114, by which tensioning device 122, a tension force can preferably hydraulically, mechanically, electromagnetically, electromotively or pneumatically be applied to the chain 108 by way of the tensioner rail 114.

The tensioning device 122 includes, for example, a hydraulic piston-cylinder arrangement, which is supplied with oil from the oil circulating system of the internal-combustion engine by way of a check valve. As soon as an oil pressure is built up during the operation of the internal-combustion engine, the piston of the tensioning device 122 is acted upon and the tensioner rail 114 is actuated in the tensioning direction. The check valve prevents a reduction of pressure in the tensioning device 122, so that the tension force for the traction device 108 is oriented according to the maximal oil pressure. A pressure reduction in the tensioning device 122 takes place only as a result of leakages at the piston. As an alternative, a separate and/or controlled pressure supply of the tensioning device 122 may be provided.

By way of the spring-and-damper device 124, the tensioner rails 114, 116 are acted upon by force toward one another, so that the traction device 108 is tensioned. Vibrations of the traction device, particularly transverse vibrations, are sprung in a controlled manner by use of the spring-and-damper device 124 and are compensated in a damped manner; an undefined or undamped vibration transmission from one tensioner rail to the other is avoided.

In addition, the vibration of the tensioner rail 114 can be controlled with respect to the internal-combustion engine housing as a fixed external reference point 126 and thus, by way of the kinematic coupling by the spring-and-damper device 124, also that of the tensioner rail 116.

By way of this arrangement according to the invention, vibrations at the timing gear are effectively provided, which finally has the result that the stress is reduced and the entire timing gear can be dimensioned to be correspondingly lighter. A more precise valve timing is achieved; the auxiliaries are subjected to a lower stress; and the running becomes smoother.

In this case, the spring-and-damper device 124 has a fixed characteristic curve. The spring-and-damper device 124 may, for example, have a progressive characteristic spring curve, so that the spring-caused restoring force rises as the deflection of the spring increases. However, as an alternative, the spring-and-damper device 124 may also have a linear or tapering characteristic curve. According to another embodiment, the spring-and-damper device 124 is adjustable, in which case the characteristic spring curve and/or the characteristic damping curve may be adjustable.

To the extent that parts of the description of FIG. 1 may also relate to the embodiments illustrated in the additional figures, these parts of the description should also be understood in connection with these additional figures.

Figure 2A:
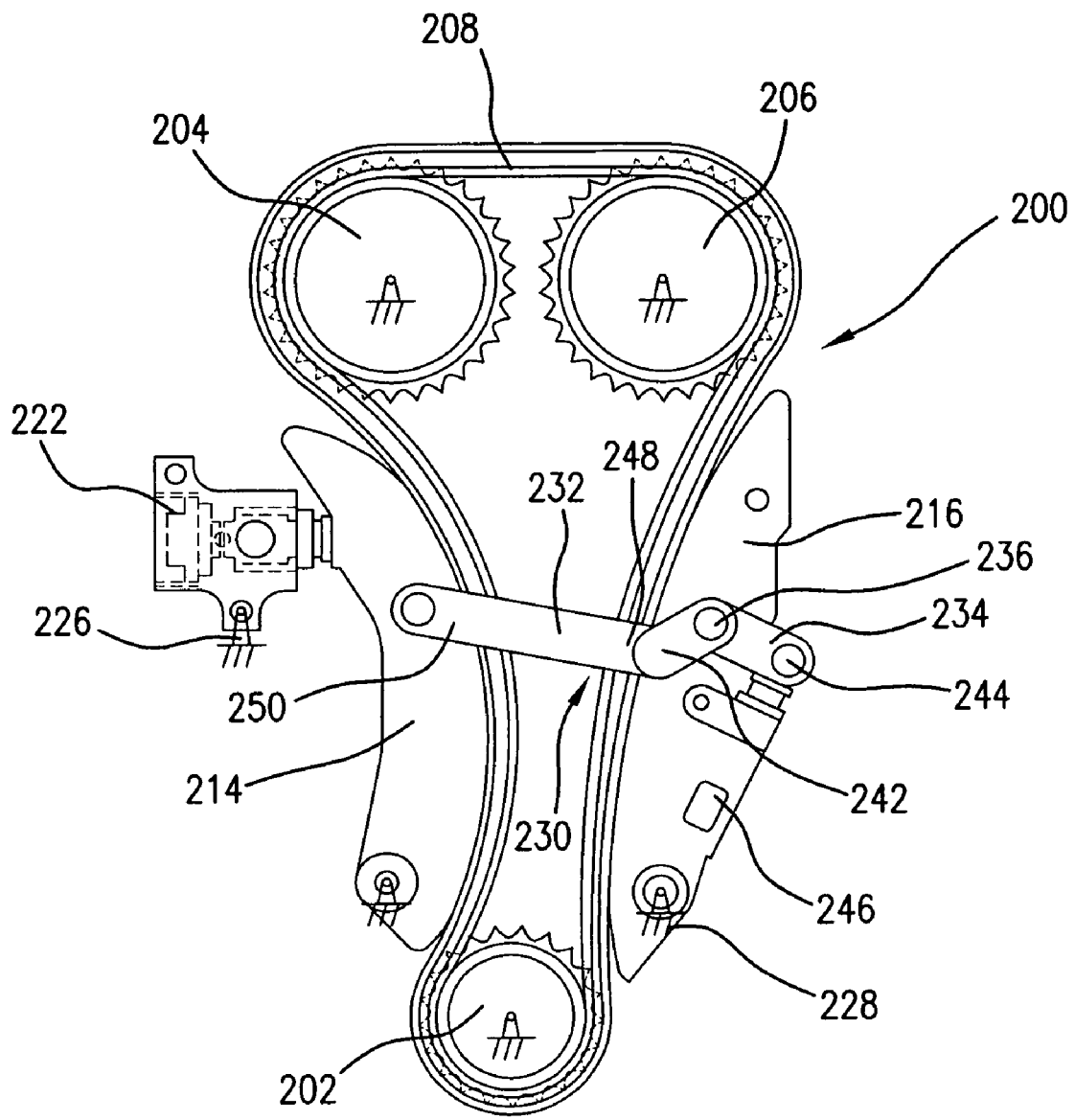
FIG. 2a is a schematic view of an example of a traction mechanism having two tensioner rails and a first tensioning device arranged between a tensioner rail and a fixed reference point, the tensioner rails being connected by way of a two-part joint device, and a second tensioning device being arranged between the joint device and a fixed reference point.
Figure 2B:
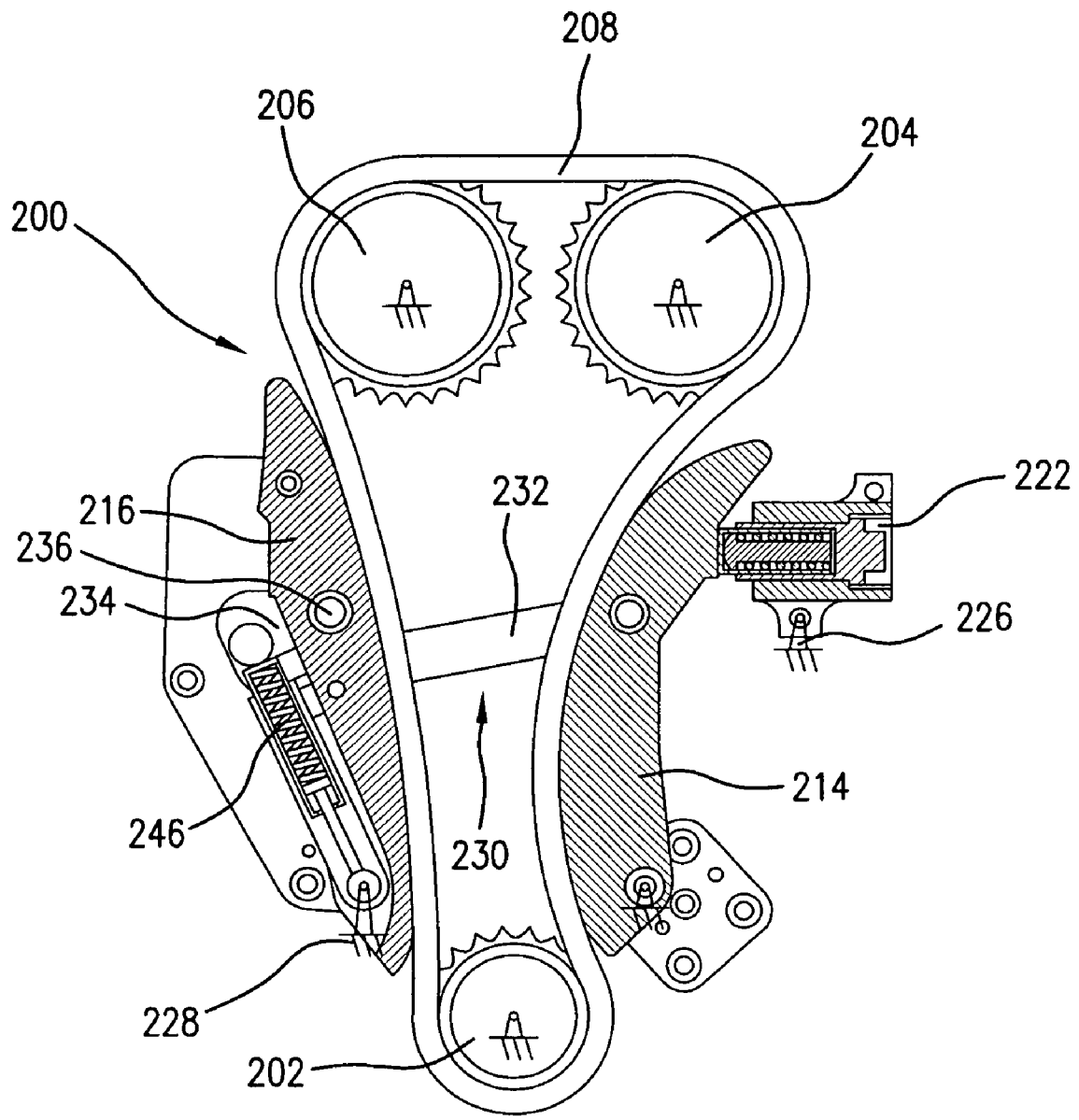
FIG. 2b is a schematic sectional view of an example of a traction mechanism having two tensioner rails and a first tensioning device arranged between a tensioner rail and a fixed reference point, the tensioner rails being connected by way of a two-part joint device and a second tensioning device being arranged between the joint device and a fixed reference point.

FIG. 2a shows a traction mechanism 200 of an internal-combustion engine (not shown here) having two tensioner rails 214, 216 and a first tensioning device 222 arranged between a tensioner rail 214 and a fixed reference point 226, such as an internal-combustion engine housing. The tensioner rails 214, 216 are connected by way of a two-part joint device 230, and a second tensioning device 246 being arranged between the joint device 230 and a fixed reference point 228, such as the internal-combustion engine housing, a sectional view of the traction mechanism 200 being illustrated in FIG. 2b.

The two tensioner rails 214, 216 are swivellably with their ends facing the crankshaft 202 linked to an internal-combustion engine housing, which is not shown here in detail but is symbolized by means of fixed bearing symbols, such as 228.

The two tensioner rails 214, 216 are connected by a two-part joint device 230, the first part 232 of the joint device 230 being assigned to the tensioner rail 214, and the second part 234 of the joint device 230 being assigned to the tensioner rail 216.

The first part 232 of the joint device 230 has a straight construction for the transmission of essentially tension/compression forces and is connected by way of one end 250 with the free end of the tensioner rail 214 in an articulated manner. The other end 248 of the first part 232 of the joint device 230 is connected in an articulated manner with a second part 234 of the joint device 230, which is assigned to the tensioner rail 216.

The second part 234 of the joint device 230 has two lever arms 242, 244 and can be rotated about a pivot 236 which simultaneously forms its fastening point at the free end of the tensioner rail 216. The lever arm 242 is connected in an articulated manner with the first part 232 of the joint device 230. The lever arm 244 is connected in an articulated manner with the second tensioning device 246 which is supported at the fastening point 228 of the tensioner rail 216.

In this case, the two lever arms 242, 244 are arranged at an angle with respect to one another, an angle of less than 180°, for example, 100° to 130°, being enclosed facing the crankshaft 202. The tensioning device 246 is arranged in this area in a space-saving manner.

The transmission behavior of the kinematic connection formed by use of the joint connection 230 can be influenced particularly by the further development of the second part 234 of the joint device 230. For example, according to one embodiment, the length of the lever arms 242, 244 is identical. In another embodiment, the lever arm 244 is longer than the lever arm 242, while, again in another embodiment, the lever arm 242 is longer than the lever arm 244. In other embodiments, the angle between the lever arms 242, 244 may also be identical or even larger than 180°.

When acted upon by way of the second tensioning device 246, the second part 234 of the joint device 230 is swiveled about the pivot 236, in which case, by way of the lever arm 242 and the first part 232 of the joint device 230, the tensioner rails 214, 216 are pulled toward one another, and the traction device 208 is tensioned.

By use of the second tensioning device 246, the tensioner rails 214, 216 are acted upon by force toward one another, so that the traction device 208 can be tensioned. Vibrations of the traction device, particularly transverse vibrations, are sprung in a controlled manner by use of the second tensioning device 246 and are compensated in a damped manner. An undefined or undamped vibration transmission from one tensioner rail to the other is avoided.

In addition, the vibration of the tensioner rail 214 with respect to the internal-combustion engine housing as a fixed external reference point 226 can be controlled and, therefore, also that of the tensioner rail 216 by way of the kinematic coupling by use of the joint device 230.

For example, the tensioning devices 222, 246 each comprise a hydraulic piston-cylinder arrangement, which is supplied with oil from the oil circulating system of the internal-combustion engine by way of a check valve. As soon as an oil pressure has been built up during the operation of the internal-combustion engine, the pistons of the tensioning devices 222, 246 are acted upon and the tensioner rails 214, 216 are operated in the tensioning direction. The check valves prevent a pressure reduction in the tensioning devices 222, 246, so that the tension force for the traction device 208 is oriented according to the maximal oil pressure. A pressure reduction in the tensioning devices 222, 246 takes place only by leakages at the pistons. By use of the check valves, the tensioning devices 222, 246 are uncoupled from one another on the operation side. As an alternative, a separate and/or controlled pressure supply of the tensioning devices 222, 246 can also be provided.

Figure 3:
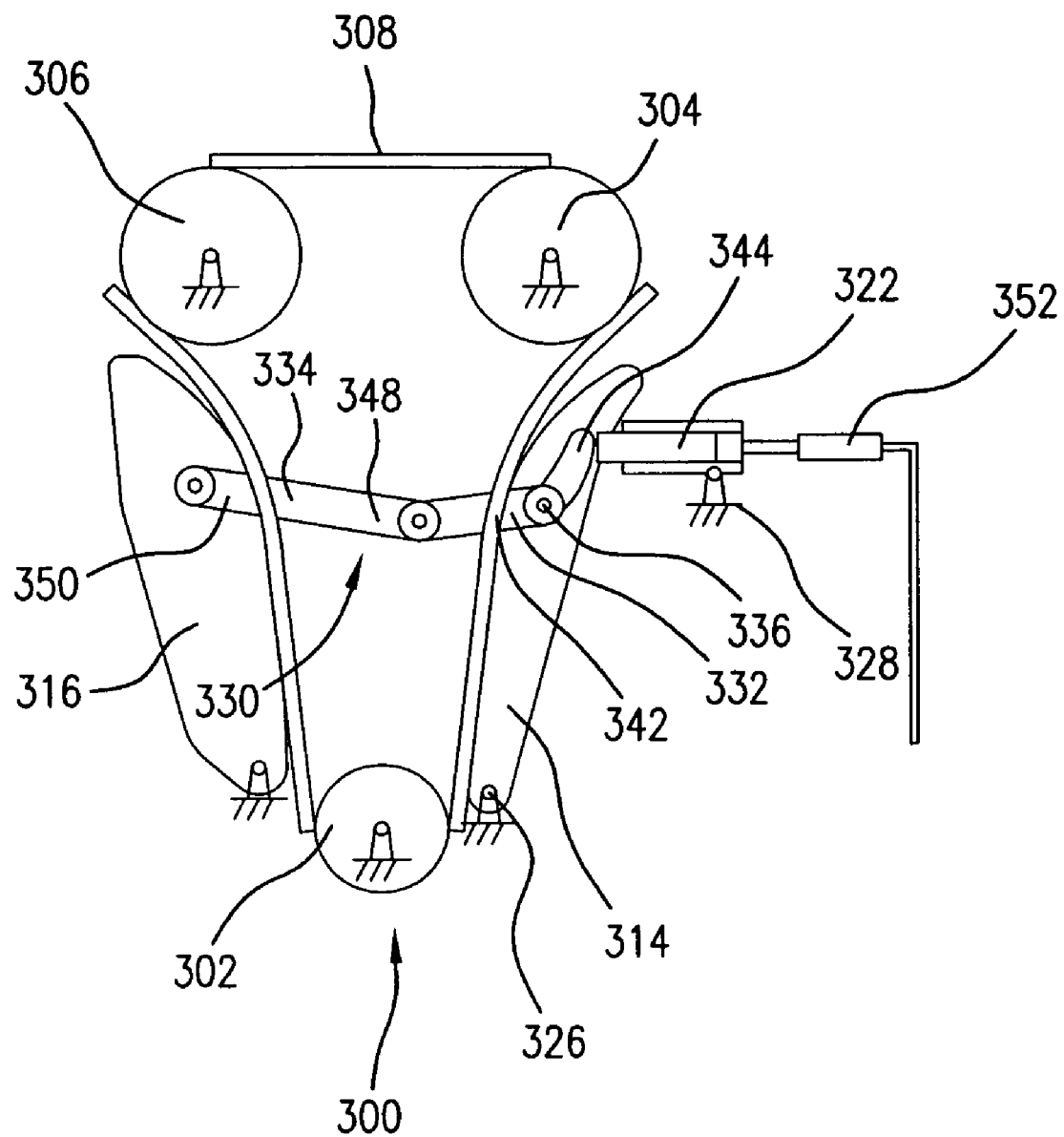
FIG. 3 is a schematic view of an example of a traction mechanism having two tensioner rails and a tensioning device arranged between a tensioner rail and a fixed reference point, the tensioner rails being connected by way of a two-part joint device, and the joint device being capable of simultaneously being acted upon by way of the tensioning device.

A traction mechanism 300 of an internal-combustion engine not illustrated here in detail having two tensioner rails 314, 316 and a tensioning device 322 arranged between a tensioner rail 314 and a fixed reference point 328, such as an internal-combustion engine housing, is illustrated in FIG. 3. Here, the tensioner rails 314, 316 are connected by way of a two-part joint device 330, and the tensioning device 322 simultaneously acts upon the joint device 330.

The two tensioner rails 314, 316 are swivellably linked by their ends facing the crankshaft 302 to an internal-combustion engine housing not illustrated here in detail but symbolized here by means of fixed-bearing symbols, such as 326.

The two tensioner rails 314, 316 are connected by a two-part joint device 330, the first part 332 of the joint device 330 being assigned to the tensioner rail 314, and the second part 334 of the joint device 330 being assigned to the tensioner rail 316.

The second part 334 of the joint device 330 has a straight construction for the transmission of essentially tension/compression forces and, by way of one end 350, is connected with the free end of the tensioner rail 316 in an articulated manner. The other end 38 of the second part 334 of the joint device 330 is connected in an articulated manner with a first part 332 of the joint device 330, which is assigned to the tensioner rail 314.

The first part 332 of the joint device 330 has two lever arms 342, 344 and can be rotated about a pivot 336, which simultaneously forms its fastening point at the free end of the tensioner rail 314. The lever arm 342 is connected in an articulated manner with the second part 334 of the joint device 330. The tensioning device 322, which is supported on the internal-combustion engine side 328, acts upon the lever arm 344.

In this case, the two lever arms 342, 344 are arranged at an angle to one another, an angle smaller than 180°, for example, 120° to 140°, being enclosed facing away from the crankshaft 302 on the interior side of the lever. The tensioning device 322 is arranged on the exterior side of the lever.

The transmission behavior of the kinematic connection formed with the joint connection 330 can be influenced particularly by the further development of the first part 332 of the joint device 330. For example, according to one embodiment, the length of the two lever arms 342, 344 is identical. In another embodiment, the lever arm 344 is longer than the lever arm 342, while, in again another embodiment, the lever arm 342 is longer than the lever arm 344. In other embodiments, the angle between the lever arms 342, 344 may also be identical or even larger than 180°. The contact area on the lever arm 344 for the tensioning device 322 has a curved surface. During the movement, a sliding motion can take place between the lever arm 344 and the tensioning device 322.

When acted upon by the tensioning device 322, the first part 332 of the joint device 330 is swiveled about the pivot 336, in which case, by way of the lever arm 342 and the second part 332 of the joint device 330, the tensioner rails 314, 316 are pulled toward one another, and the traction device 308 is tensioned.

By way of the tensioning device 322, the tensioner rails 314, 316 can be acted upon toward one another by force, so that the traction device 308 can be tensioned. Vibrations of the traction device, particularly transverse vibrations, are compensated in a controlled sprung and damped manner by way of the tensioning device 322. An undefined or undamped vibration transmission from one tensioner rail to the other is avoided.

Simultaneously, by use of the single tensioning device 322, the tensioner rail 314 can be tensioned with respect to the internal-combustion engine housing as the fixed external reference point 328. By way of the joint device 330, the tensioner rail 316 also has a reference to the internal-combustion engine housing used as the fixed reference point. The vibration of the tensioner rail 314 can be controlled in a defined manner and, as a result, by way of the kinematic coupling via the joint device 330, also that of the tensioner rail 316.

For example, the tensioning device 322 comprises a hydraulic piston-cylinder arrangement, which is supplied with oil from the oil circulating system of the internal-combustion engine by way of a check valve 352. As soon as an oil pressure has been built up during the operation of the internal-combustion engine, the piston of the tensioning device 322 is acted upon and the tensioner rails 314, 316 are operated in the tensioning direction. The check valve 352 prevents a pressure reduction in the tensioning device 322, so that the tension force for the traction device 308 is oriented according to the maximal oil pressure. A pressure reduction in the tensioning device 322 takes place only by leakages at the piston. As an alternative, a separate and/or controlled pressure supply of the tensioning device 322 can also be provided.

Figure 4:
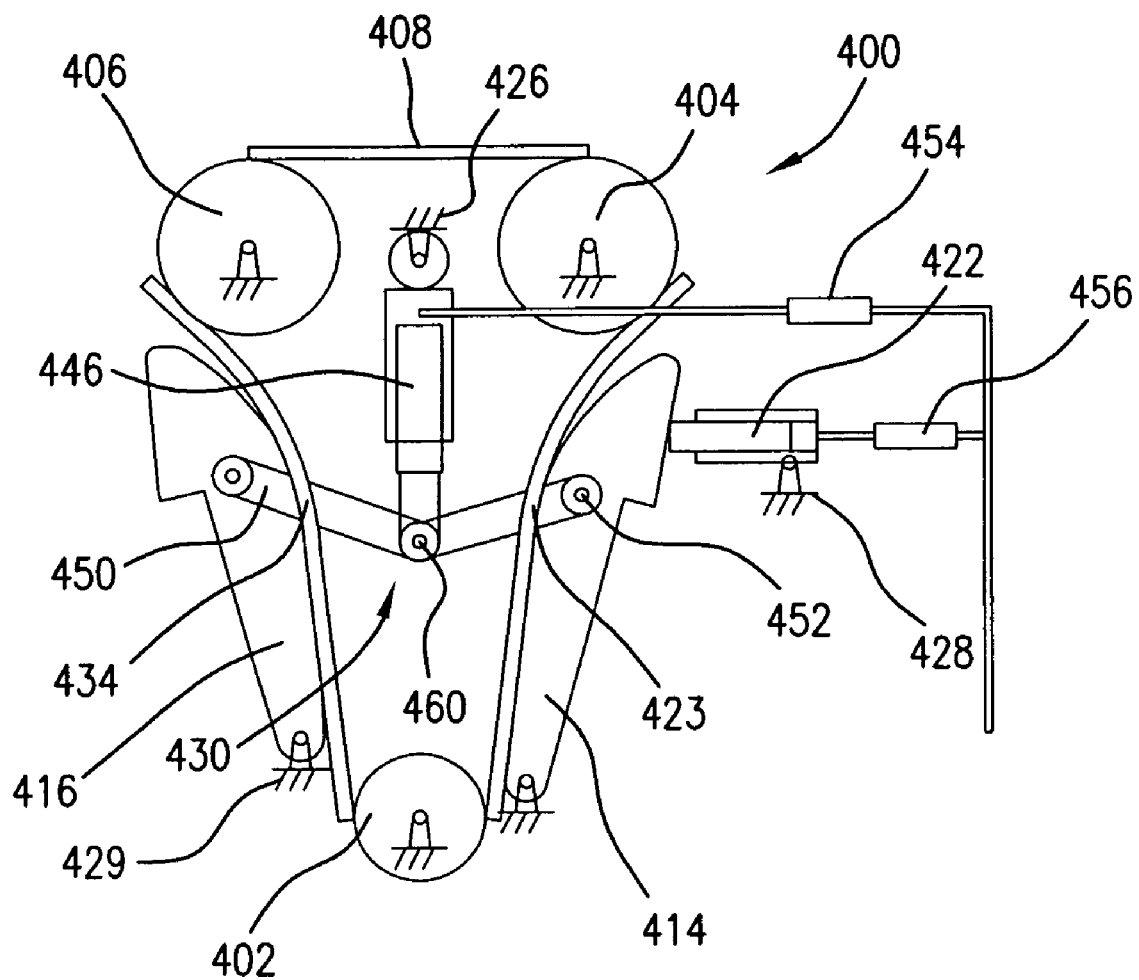
FIG. 4 is a schematic view of an example of a traction mechanism having two tensioner rails and a first tensioning device arranged between a tensioner rail and a fixed reference point, the tensioner rails being connected by way of a two-part joint device, and a second tensioning device being arranged between the joint device and a fixed reference point.

A traction mechanism 400 of an internal-combustion engine (not illustrated here in detail) having two tensioner rails 414, 416 and a first tensioning device 422 arranged between a tensioner rail 414 and a fixed reference point 428, such as an internal-combustion engine housing, is illustrated in FIG. 4. The tensioner rails 414, 416 are connected by way of a two-part joint device 430, and a second tensioning device 446 is arranged between the joint device 430 and a fixed reference point 426, such as an internal-combustion engine housing.

The two tensioner rails 414, 416 are swivellably linked by their ends facing the crankshaft 402 to an internal-combustion engine housing not illustrated here in detail but symbolized here by means of fixed-bearing symbols, such as 429.

The two tensioner rails 414, 416 are connected by way of a two-part joint device 430, the first part 432 of the joint device 430 being assigned to the tensioner rail 414, and the second part 434 of the joint device 430 being assigned to the tensioner rail 416.

For the transmission of essentially tension/compression forces, the two parts 432, 434 of the joint device 430 have a straight further development and are each connected in an articulated manner by one end 450, 452, with the free ends of the tensioner rails 414, 416. The other ends of the two parts 432, 434 of the joint device 430 are connected with one another in an articulated manner.

The second tensioning device 446 is applied to the connection point 460 of the two parts 432, 434 of the joint device 430, which second tensioning device 446 is supported on the other side in a fixed manner on the internal-combustion engine 426. When the joint device 430 is acted upon by the second tensioning device 446, the tensioner rails 414, 416 are pulled toward one another, and the traction device 408 is tensioned.

By way of the second tensioning device 446, the tensioner rails 414, 416 are acted upon by force toward one another, so that the traction device 408 can be tensioned. Vibrations of the traction device, particularly transverse vibrations, are sprung in a controlled manner by use of the second tensioning device 446 and are compensated in a damped manner. An undefined or undamped vibration transmission from one tensioner rail to the other is avoided.

In addition, the vibration of the tensioner rail 414 with respect to the internal-combustion engine housing as a fixed external reference point 428 can be controlled and therefore also that of the tensioner rail 416 by way of the kinematic coupling via the joint device 430.

For example, the tensioning devices 422, 446 each comprise a hydraulic piston-cylinder arrangement, which are supplied with oil from the oil circulating system of the internal-combustion engine by way of check valves 454, 456. As soon as an oil pressure has been built up during the operation of the internal-combustion engine, the pistons of the tensioning devices 422, 446 are acted upon and the tensioner rails 414, 416 are operated in the tensioning direction. The check valves 454, 456 prevent a pressure reduction in the tensioning devices 422, 446, so that the tension force for the traction device 408 is oriented according to the maximal oil pressure. A pressure reduction in the tensioning devices 422, 446 takes place only by leakages at the pistons. By way of the check valves, the tensioning devices 422, 446 are uncoupled from one another on the operation side. As an alternative, a separate and/or controlled pressure supply of the tensioning devices 422, 446 can also be provided.

Figure 5A:
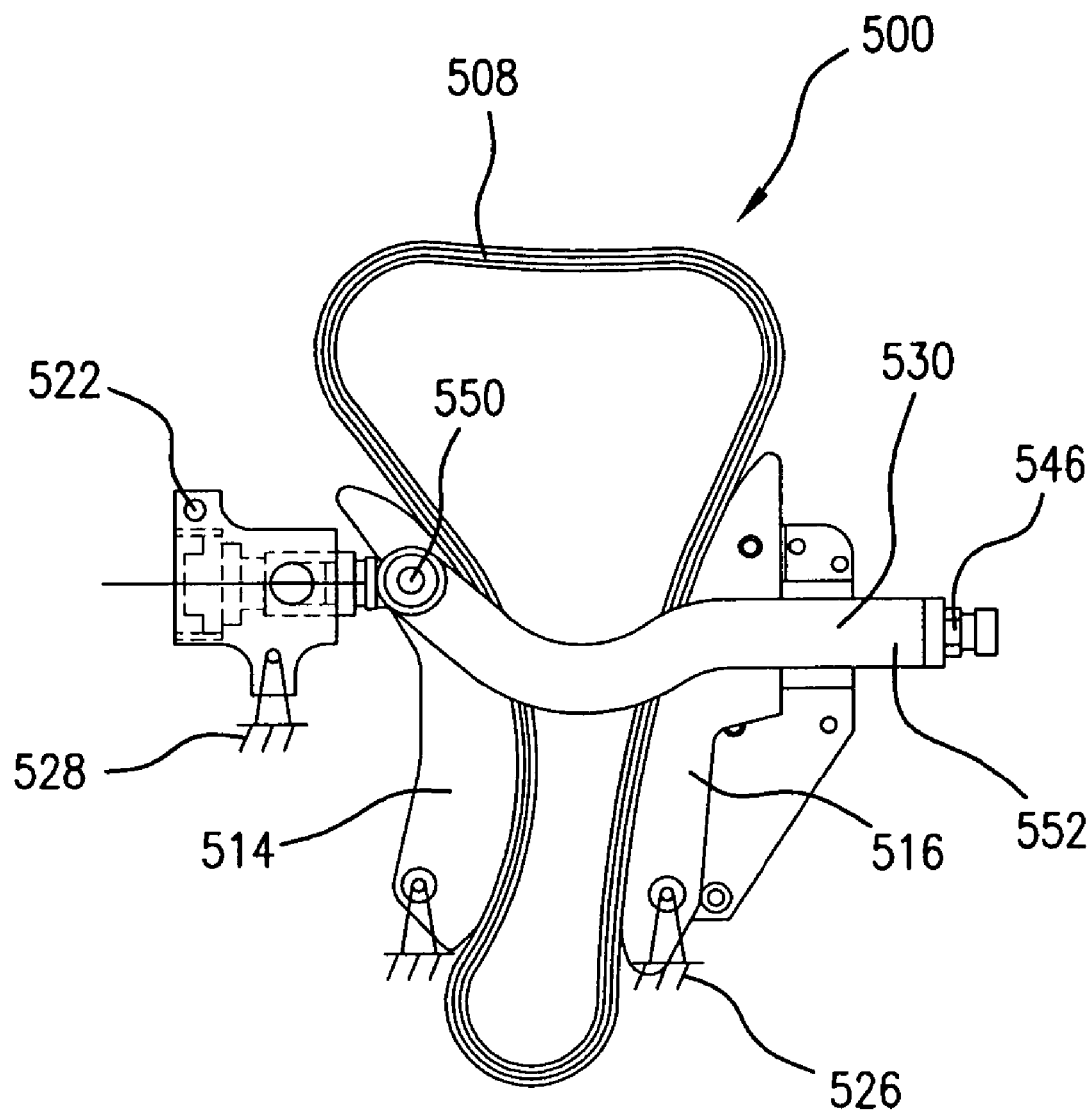
FIG. 5a is a schematic view of an example of a traction mechanism having two tensioner rails and a first tensioning device arranged between a tensioner rail and a fixed reference point as well as a second tensioning device arranged between the tensioner rails.
Figure 5B:
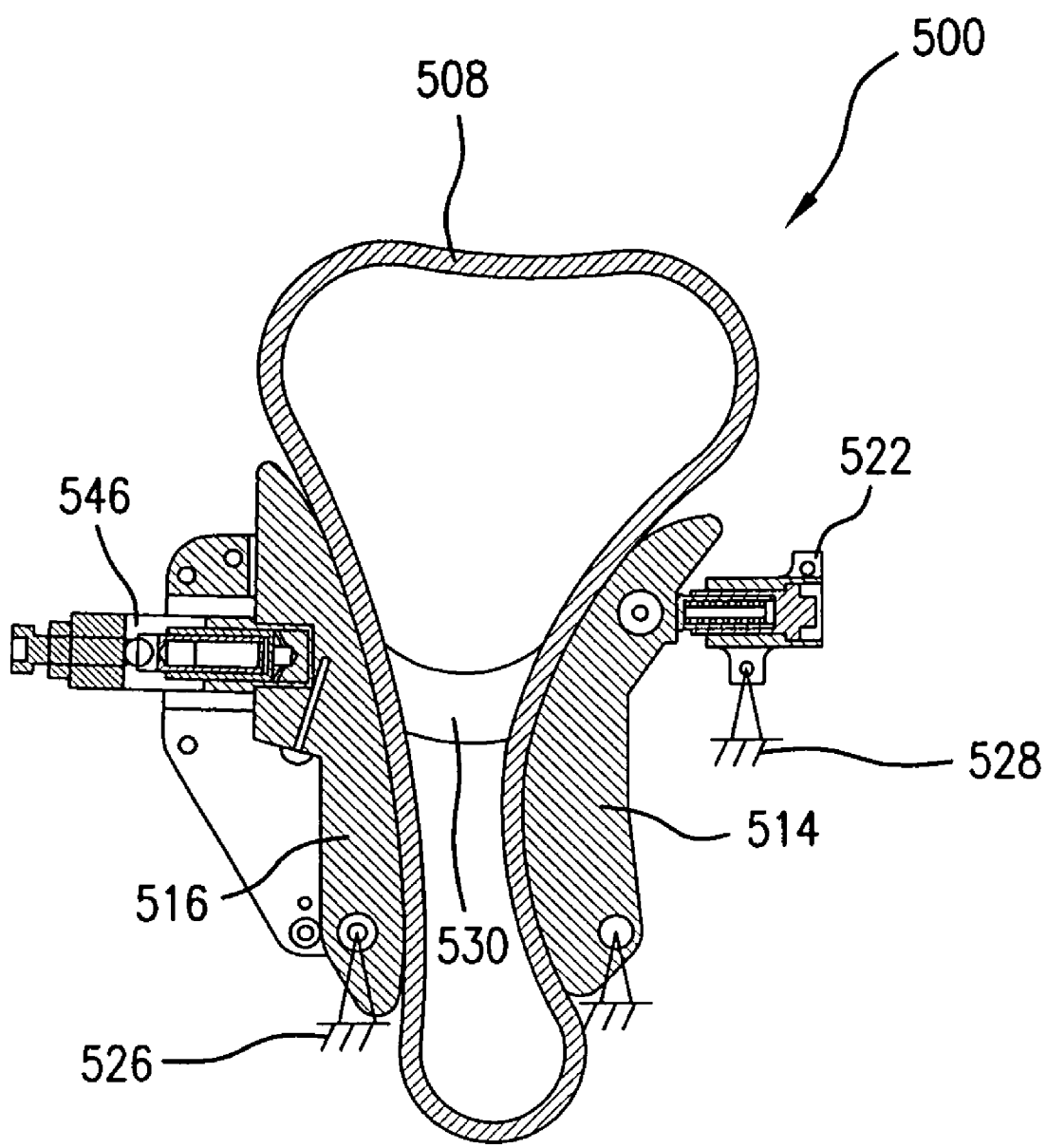
FIG. 5b is a schematic sectional view of an example of a traction mechanism having two tensioner rails and a first tensioning device arranged between a tensioner rail and a fixed reference point as well as a second tensioning device arranged between the tensioner rails.

A traction mechanism 500 having two tensioner rails 514, 516 and a first tensioning device 522 arranged between a tensioner rail 514 and a fixed reference point 528, such as an internal-combustion engine housing, as well as a second tensioning device 546 arranged between the tensioner rails 514, 516 is illustrated in FIG. 5a. FIG. 5b is a sectional view of the traction mechanism 500.

The two tensioner rails 514, 516 are swivellably linked by way of their ends facing the crankshaft (in the figure: lower ends) to an internal-combustion engine housing not illustrated here in detail but symbolized by means of fixed-bearing symbols, such as 526.

A tensioning device 522 supported on the internal-combustion engine side 528 as a fixed external reference point is assigned to the tensioner rail 514, by which tensioning device 522, a tension force can be applied to the traction device 508 by way of the tensioner rail 514.

The second tensioning device 546 acts between the tensioner rails 514, 516 and is supported on the first tensioner rail 514 on one side and on the second tensioner rail 516 on the other side. In this case, the second tensioning device 546 is connected with the tensioner rail 516 directly and with the tensioner rail 514 by way of a connection element 530 in an articulated manner.

The connection element 530 is further developed to be crescent-shaped with a bent and a straight section. The end of the bent section is connected in a connection point 550 with the free end of the tensioner rail 514 in an articulated manner. The first tensioning device 522 is also applied to the connection point 550. The end 552 of the straight section is connected in an articulated manner with an end of the second tensioning device 546, whose other end is linked to the tensioner rail 516.

By way of the second tensioning device 546, the tensioner rails 514, 516 are acted upon by force toward one another, so that the traction device 508 is tensioned. Vibrations of the traction device, particularly transverse vibrations, are sprung in a controlled manner by use of the second tensioning device 546 and are compensated in a damped manner. An undefined or undamped vibration transmission from one tensioner rail to the other is avoided.

Simultaneously, by way of the tensioning device 522, the tensioner rail 514 can be tensioned with respect to the internal-combustion engine housing as the fixed external reference point 528. By way of the connection element 530, the tensioner rail 516 also has a reference to the internal-combustion engine housing used as the fixed reference point. The vibration of the tensioner rail 514 can be controlled in a defined manner and, as a result, by way of the kinematic coupling via the connection elements 530, also that of the tensioner rail 516.

For example, the tensioning devices 522, 546 comprise a hydraulic piston-cylinder arrangement, which is supplied with oil from the oil circulating system of the internal-combustion engine by way of a check valve. As soon as an oil pressure has been built up during the operation of the internal-combustion engine, the pistons of the tensioning devices 522, 546 are acted upon and the tensioner rails 514, 516 are operated in the tensioning direction. The check valves prevent a pressure reduction in the tensioning devices 522, 546, so that the tension force for the traction device 508 is oriented according to the maximal oil pressure. A pressure reduction in the tensioning devices 522, 546 takes place only by leakages at the pistons. By use of the check valves, the tensioning devices 522, 546 are uncoupled from one another on the operation side. As an alternative, a separate and/or controlled pressure supply of the tensioning devices 522, 546 can also be provided.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A traction mechanism for driving camshafts of an internal-combustion engine, comprising:
    a drive wheel;
    a driven wheel;
    a traction device coupling the drive wheel and the driven wheel;
    tensioner rails acting upon the traction device;
    wherein a first tensioner rail is acted upon by tension force via a first tensioning device supported on the first tensioner rail on one side and externally on the other side;
    a mechanical link by which the first tensioner rail is connected with the second tensioner rail in a defined force- and motion-transmitting manner, an end of the mechanical link being pivotally connected to the first tensioning device, and
    a second tensioning device being directly and pivotally connected to another end of the mechanical link.

2. The traction mechanism according to claim 1, wherein the tensioner rails are connected by a two-part joint device of the mechanical link, a first part of the joint device being connected to the first tensioner rail, and a second part of the joint device being connected to the second tensioner rail.

3. The traction mechanism according to claim 2, wherein the second part of the two-part joint device has a first and a second lever arm, extending from a pivot operatively connected to the second tensioner rail, the first lever arm being connected with the first part of the joint device, and the second lever arm being operatively configured to be acted upon by tension force via the second tensioning device.

4. The traction mechanism according to claim 3, wherein the second tensioning device is supported on the second lever arm on one side and on the internal-combustion engine on the other side.

5. The traction mechanism according to claim 3, wherein axes of the first and second lever arms are arranged at an angle to one another.

6. The traction mechanism according to claim 2, wherein the first part of the joint device has a substantially straight configuration, one end being connected with the second part of the joint device and another end being connected with the first tensioner rail in a force and motion-transmitting manner.

7. The traction mechanism according to claim 2, wherein the first part of the two-part joint device has a first and a second lever arm, starting from a pivot assigned to a first tensioner rail, the first lever arm being connected with the second part of the joint device, and the second lever arm being operatively configured to be acted upon by tension force via the first tensioning device.

8. The traction mechanism according to claim 7, wherein starting from the pivot, axes of the first and second lever arms are arranged at an angle with respect to one another.

9. The traction mechanism according to claim 7, wherein the second part of the two-part joint device has an essentially straight construction, one end being connected with the first part of the joint device and the other end being connected with the second tensioner rail in a force- and/or motion-transmitting manner.

10. The traction mechanism according to claim 2, wherein the two parts of the two-part joint device are mutually connected in a pivot, and the pivot is operatively configured to be acted upon by tension force via the second tensioning device.

11. The traction mechanism according to claim 10, wherein the second tensioning device is supported at the pivot on one side and at the internal-combustion engine on the other side.

12. The traction mechanism according to claim 1, wherein the at least one of the first and the second tensioning device is operated at least one of hydraulically, mechanically, electromagnetically, electromotively and pneumatically.

13. The traction mechanism according to claim 12, wherein the tensioning device comprises a piston, which is hydraulically actuable.

14. The traction mechanism according to claim 13, wherein the tensioning device is hydraulically supplied with lubricating oil of the internal-combustion engine.

15. The traction mechanism according to claim 1, wherein at least one of the first tensioning device and the second tensioning device is acted upon by a substantially constant pressure, which does not fall below a predetermined minimum value.

16. The traction mechanism according to claim 1, wherein at least one of the first tensioning device and the second tensioning device is acted upon in a controlled manner by discretely or continuously varying pressure.

17. The traction mechanism according to claim 1, wherein at least one of the first tensioning device and the second tensioning device is supplied with pressure medium by way of a check valve.

18. The traction mechanism according to claim 1, wherein the first and the second tensioner rail have differently shaped guiding areas.

* * * * *